(12) United States Patent
Lenhardt et al.

(10) Patent No.: US 6,439,655 B1
(45) Date of Patent: Aug. 27, 2002

(54) OPENABLE HATCH IN A FIXED ROOF SURFACE OF MOTOR VEHICLE

(75) Inventors: Jörn Lenhardt, Neustrelitz; Hans-Michael Wardenga, Neddemin; Helmut Stenzel; Dieter Schulz, both of Neubrandenburg, all of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/670,805

(22) Filed: Sep. 28, 2000

(30) Foreign Application Priority Data

Sep. 28, 1999 (DE) .......................... 199 46 500

(51) Int. Cl.⁷ ................................................. B60J 7/08
(52) U.S. Cl. ................................... 296/216.02; 296/223
(58) Field of Search ............................... 296/223, 224, 296/216.02; 49/324

(56) References Cited

U.S. PATENT DOCUMENTS

| | | | | |
|---|---|---|---|---|
| 3,137,491 A | * | 6/1964 | Coenen | 296/223 X |
| 4,329,917 A | * | 5/1982 | Fisher et al. | 296/216.02 X |
| 4,732,422 A | * | 3/1988 | Schlapp et al. | 296/223 X |
| 4,866,882 A | * | 9/1989 | Capppello | 49/324 |

FOREIGN PATENT DOCUMENTS

| | | | |
|---|---|---|---|
| DE | 40 11 903 | 8/1991 | |
| DE | 197 47 861 | 5/1999 | |
| JP | 205514 | * 9/1986 | 296/223 |

* cited by examiner

*Primary Examiner*—Dennis H. Pedder
(74) *Attorney, Agent, or Firm*—Nixon Peabody LLP; David S. Safran

(57) ABSTRACT

A hatch in a fixed roof surface of a motor vehicle with a frame (1) which is located in the roof cutout in the roof surface, with a cover (2) which can be opened and closed relative to the frame (1) via a raising mechanism, and with an actuating mechanism for the raising mechanism, the raising mechanism having a first pair of toggle joints (3 and 4) which are supported on the frame (1) to raise one edge of the cover (2) and a second pair of toggle joints (5 and 6) which are supported on the frame (1) to raise the opposite edge of the cover (2), and the actuating mechanism having a transmission mechanism (24) which can be moved along the frame (1), which is guided on the frame (1), and to which actuating elements (28, 29 and 30, 28', 29', 30') are attached for simultaneous actuation of the toggle joints of a respective one of the first and second pairs of toggle joints (3, 4 and 5, 6).

17 Claims, 4 Drawing Sheets

OPENABLE HATCH IN A FIXED ROOF SURFACE OF MOTOR VEHICLE

BACKGROUND OF THE INVENTION

1. Field of the Invention

The invention relates to a hatch in a fixed roof surface of a motor vehicle with a frame which is located in a roof cutout in the roof surface, with a cover which can be opened and closed relative to the frame via a raising mechanism and with an actuating means for the raising means.

2. Description of Related Art

Hatches of the type to which the invention is directed are contained in the fixed roof surfaces of commercial vehicles such as busses and the like, or in trailers. They are used to ventilate the vehicle interior and can also be made as emergency exit means, for example, in busses based on legal regulations. The hatches conventionally contain a frame which is located in the roof cutout of the roof surface and a cover which opens and closes relative to this frame.

German Patent DE 40 11 903 C1 describes a motor vehicle roof having a fixed roof surface in which there is a roof opening which can be opened and closed by means of a cover. The cover is connected via two axes which run transversely to the lengthwise direction of the vehicle via a pivot bearing and a raising mechanism with a frame which is inserted into the roof opening. As the actuating means, there is a control element which is located centrally on the cover, which can turn around its axis and which actuates the raising mechanism located on the cover.

Published German Patent Application DE 19747861 A1 discloses a hatch for stationary use in buildings which can be raised on one side by means of a hydraulic cylinder which acts on a toggle lever mechanism.

SUMMARY OF THE INVENTION

The primary object of the present invention is to devise a hatch of the initially mentioned type which has a simpler structure and an improved actuating mechanism.

This object is achieved in accordance with the invention by the raising mechanism having two toggle joints which are supported on the frame to raise one edge of the cover and two toggle joints which are supported on the frame to raise an opposite edge of the cover, and by the actuating mechanism having a transmission which can be moved along the frame, which is guided on the frame, and to which actuating elements are attached for simultaneous actuation of the two pairs of toggle joints.

Thus, in this hatch, the raising mechanism, the actuating mechanism and the movable transmission are located on the frame so that, on the cover, there need be only holding devices for connecting the cover to the toggle joint. Therefore, the weight of the cover is not increased and means which adversely affect the visual appearance of the cover are not necessary, which is especially important where the cover is transparent. Optionally, the transmission means can be guided largely to the individual toggle joints on the frame.

When the movable transmission means is guided peripherally or continuously around a roof opening which is surrounded by a frame, by means of the uniform motion of the transmission means in one direction of motion, for example, in a forward motion, the first two pair of toggle joints can can be actuated or raised at the same time, and after a further path of movement of the transmission, the second pair of toggle joints are raised or actuated. By movement in the opposite direction (backwards motion) the toggle joints are actuated or retracted in the opposite motion sequence. Preferably, the transmission can be driven in a translational forward and backward motion. Depending on the arrangement and distribution of the toggle joints and the actuating elements along the frame, most any raising motions of the cover around different axes such as, for example, the lengthwise axes and transverse axes of the motor vehicle can be carried out.

The transmission is a cable, for example, a steel or a plastic cable. In alternative embodiments, the transmission is a chain, belt or wire spiral spindle as is used in the drive of sliding roofs, or a rod. To guide and deflect the transmission, for a cable or belt, deflection rollers, for a chain, gears, and for a wire spiral spindle, arc sections can be attached to the frame.

Preferably, the actuating elements are attached by force-fit and/or form-fit to the transmission means. On one cable, for example, actuating bodies can be pressed securely against intended locations. On one rod or chain, the actuating elements can be inserted into recesses and fixed therein.

Each toggle joint can comprise a pivoting toggle lever which has a defined engagement section for the respective actuating elements. This engagement section is matched to the shape and type of actuating elements used, which can be made, for example, as balls, ellipsoids or cylinders. The engagement section on the toggle contains, for example, a recess into which the respective actuating element can be moved by the transmission means. After engagement, the actuating element, which has continued to move, pivots the toggle lever into its other position.

For emergency opening of the hatch it can be provided that the connection of the toggle joint to the cover is made detachable. For example, the toggle lever is pivotally connected via an additional lever to the cover and the connection or support of this lever to the cover or on the cover is detachable for emergency opening of the cover. When the bearing pins which support the lever on the cover are released, on one of the two raising axes, the raising axis which is the other one at the time forms a folding axis of the cover for emergency opening. In this case additional safety elements for securing the cover to the hatch are not necessary.

Preferably, the transmission can be driven by a manually actuated drive unit or by a drive motor. For example, there can be two toggle joints which are paired with each other and which can be actuated at the same time by the actuating mechanism for raising the left and the right edge of the cover or for raising the front and the rear edge of the cover by means of a freely selectable, arrangement of the toggle joints on the frame and the associated actuating elements of the transmission, and the instant of raising and the raising sequence can be fixed by the number and the arrangement of actuating elements.

Accordingly, it can be provided that a second actuating element is assigned to the toggle joint which can be actuated first and resets the raised toggle joint in backward motion of the transmission before actuation of the other toggle joint.

Preferably, the transmission, and especially the cable, are pre-tensioned by spring force so that actuation takes place without play and reliable engagement of the actuating element with the toggle lever is ensured.

When the same types of toggle joints are used, the completely opened cover is roughly parallel to the frame, and thus, relative to the motor vehicle roof. According to one alternative embodiment, it can be provided that the completely opened cover can be set into a position which is not parallel to the frame by a different length and/or configuration of the toggle lever and/or the additional lever of a pair of toggle joints.

In the described hatch, the position of the cover can be set in the sequence "entirely closed"→"rear up"→"front up"→"back closed"→"entirely closed" or "entirely closed"→"front up"→"rear up"→"front closed"→"entirely closed."

One embodiment of the invention is detailed below with reference to the drawings.

DETAILED DESCRIPTION OF THE INVENTION

Figure 1:
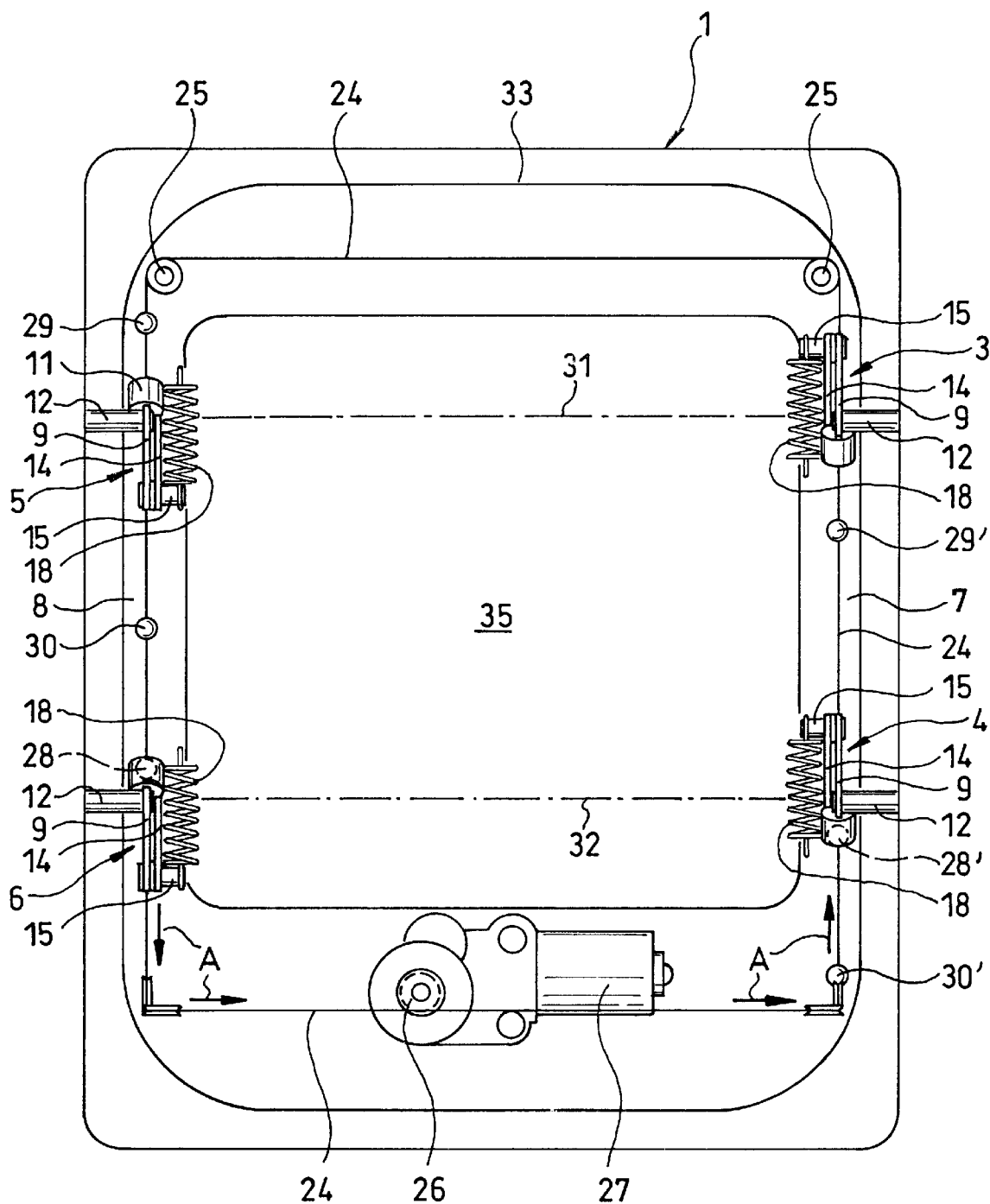
FIG. 1 is a plan view of a hatch in accordance with the invention.
Figure 2:
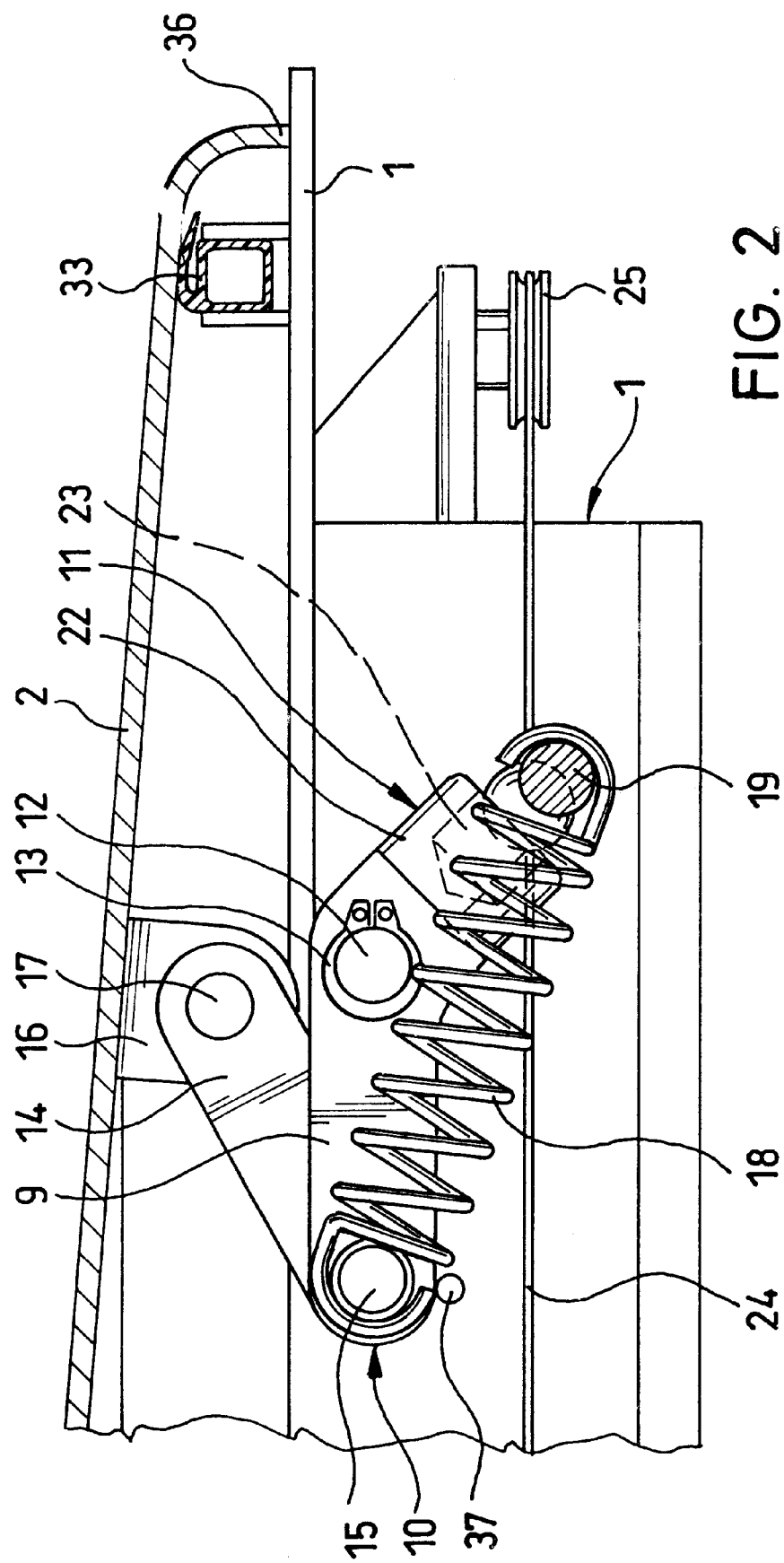
FIG. 2 is a side elevational view of a portion of the hatch in the area of a toggle joint with the hatch closed.

In FIG. 1 a hatch is shown in a fixed roof surface of a motor vehicle which has a frame 1 in a cutout opening formed in the fixed roof surface. On the frame 1, the cover 2 (see FIGS. 2 & 3) is supported by means of a raising mechanism which has four toggle joints 3, 4, 5 & 6, which are arranged in two pairs, two toggle joints 3, 4 being located spaced apart in the lengthwise direction of the vehicle, for example, on the right frame part 7 of the frame 1 and two toggle joints 5, 6 being similarly spaced apart on the left frame part 8 of the frame 1. Each toggle joint 3, 4, 5, 6 has an angled toggle lever 9 with a joint end 10 and an engagement end 11. The toggle lever 9 is pivotally mounted between its ends 10, 11 on a transversely aligned bearing axle 12 which is attached to the frame 1 and is axially secured with an element 13. An additional lever 14 is, on the one hand, pivotally mounted by means of a bearing pin 15 on the joint end 10 of the toggle lever 9, and on the other hand, is pivotally mounted on a holding device 16 of the cover 2 by means of a bearing pin 17. A tension spring 18 is connected between the bearing pin 15 and a journal 19 attached to the frame 1. In a first end position of the toggle lever 9 in which the cover 2 is closed (FIG. 2) and in a second end position in which the cover 2 is raised and opened via the toggle joint (FIG. 3), the tension spring 18 applies a tensioning stress to the bearing pin 15. Between the first and the second end position, the toggle lever 9 is at the dead center position in which the journal 19, the bearing axles 1: and the bearing pin 15 lie on a straight line and the tensile stress of the tension spring 18 is increased. The toggle lever 9 and the additional lever 14 are held in the second end position by the stops 20 and 21. In the first end position (FIG. 2), the contact or locking of the toggle lever 9 can be selectively achieved by a stop 36 of the cover 2 on the frame 1 or by an additional stop 37 on the frame 1 directly on the toggle lever 9.

The engagement end 11 of the toggle lever 9 contains a cylinder section 22 with a recess or depression 23 which is open on its end face and which is made, for example, as a blind hole.

The actuating mechanism for the toggle joints 3 to 6 contains a cable 24 which extends peripherally in a rectangular arrangement on the frame 1 via deflection rolls 25 which are supported on the frame 1 and is guided by lengthwise slots on the engagement ends 11 of the toggle lever 9 of all four toggle joints 3 to 6. The cable 24 is guided via a drive wheel 26 of a drive means 27 which contains, for example, an electric drive motor and can be moved back and forth by the latter in these two cable directions. For pivoting of the toggle levers 9, three actuating elements 28, 29, and 30 are provided on the cable 24 and act on the toggle joints 5, 6 at the left frame part 8 and three actuating elements 28', 29' and 30' act on the toggle joints 3, 4 attached to the right frame part 7. When the cable 24 is moved by the drive means 27, first of all, the actuating element 28, for example, a ball attached to the cable, fits into the recess 23 of the engagement end 11 of the toggle lever 9 when the latter is in its closed position according to FIG. 2. The actuating element 28 which the cable 24 has continued to move pivots the toggle lever 9 against the force of the tension spring 18, until the toggle lever 9, after passing its dead center position, is swung into the stable end position shown in FIG. 3 which represents the open position of the cover 2. Preferably, the cable 24 is pre-tensioned by the spring force exerted by spring 18 via the toggle lever 9 so that actuation takes place without play and reliable engagement of the actuating element with the toggle lever is ensured.

As is apparent from FIG. 1, the toggle joints 3 to 6 are arranged on the right and on the left frame part 7 and 8 such that the two pairs of opposite side toggle joints 3, 5 and 4, 6 form a front or rear raising axis 31 or 32 which lie crosswise relative to the lengthwise direction of the motor vehicle. Furthermore, the toggle levers 9 are supported on the bearing axles 12 in an alignment such that, in the closed position of the toggle joints 3 to 6, the respective engagement ends 11 with regard to the lengthwise motion of the cable 24 point in the same direction of motion.

The actuating elements 28,29 and 30 and 28', 29' and 30' are attached to the cable 24 with spaces such that, in lengthwise movement of the cable 24 in the direction of the arrow A as shown in FIG. 1, first the two toggle joints 4 and 6 of the rear raising axis 32 are actuated at the same time by the actuating elements 28 and 28' and are pivoted into the open position. In this way, the cover 2 is raised on the two rear toggle joints 4 and 6, while it still rests forward on the frame 1, for example, on a seal 33. The front toggle joints 3 and 5 can be raised by the required path against the force of their tension springs 18.

As the cable 24 continues to move lengthwise, the respective actuating elements 28, 28' emerge from the engagement end 11 of the toggle lever 9 (FIG. 3), while the two actuating elements 29 and 29' engage the front toggle joints 3 and 5 and the respective toggle levers 9 pivot into the end position which corresponds to the open position of the cover 2 in the area of the front raising axis 31. Thus, also the front edge of the cover 2 is swung up so that the cover 2 runs roughly parallel to the roof surface when the toggle joints are made in the same way. The front and the rear toggle joints 3, 5 and 4, 6 can, however, also be made differently, for example, with different lengths of the toggle lever 9 and/or the additional lever 14, so that the respective raising height can be different; this is advantageous for through ventilation and exhaust ventilation, especially when driving. Such a modification is shown in FIG. 4 where the toggle levers 9' of toggle joints 3', 4' are longer than the toggle levers 9 of toggle joints 5, 6.

Figure 3:
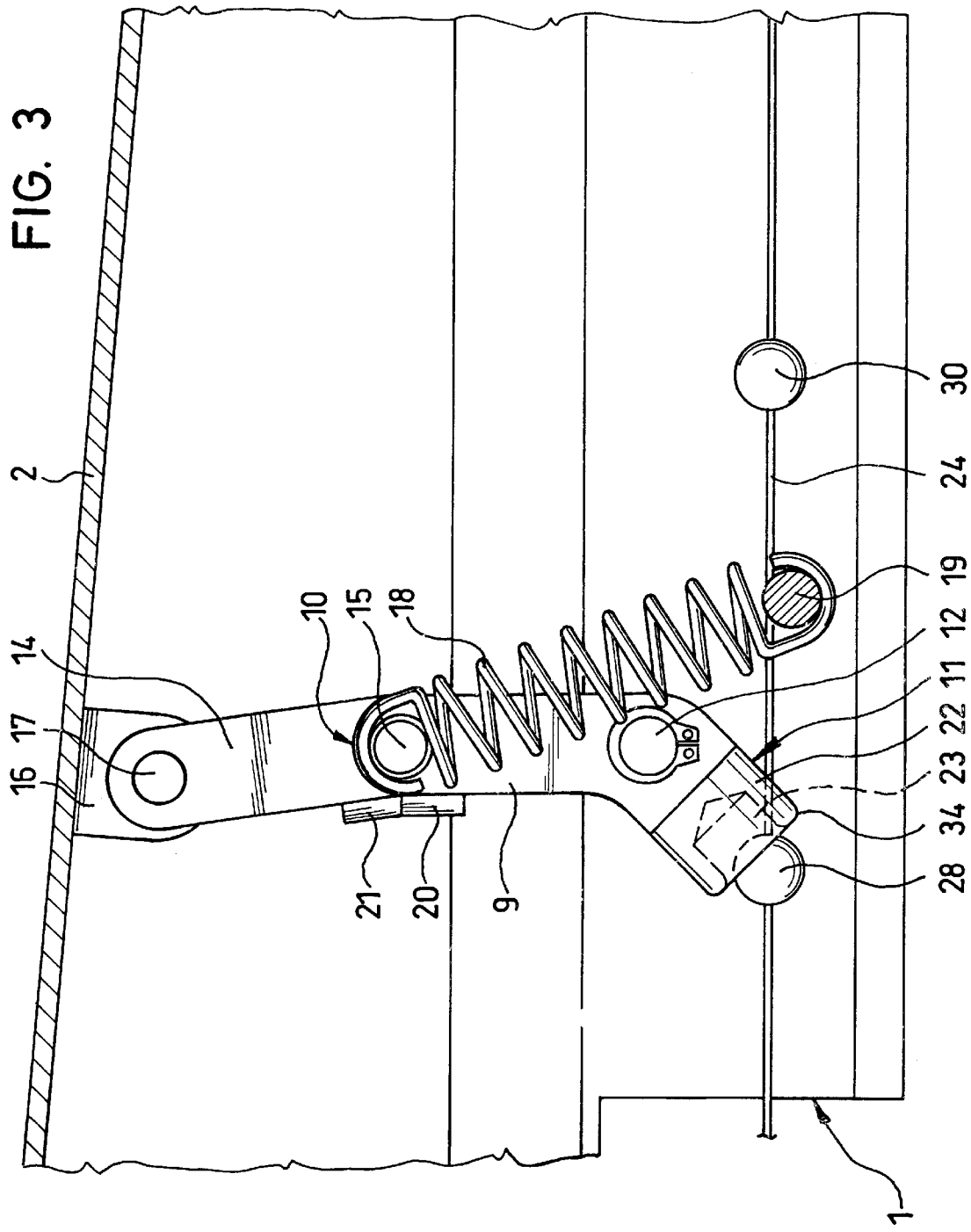
FIG. 3 is a side view corresponding to that of FIG. 2 but with the hatch opened.
Figure 4:
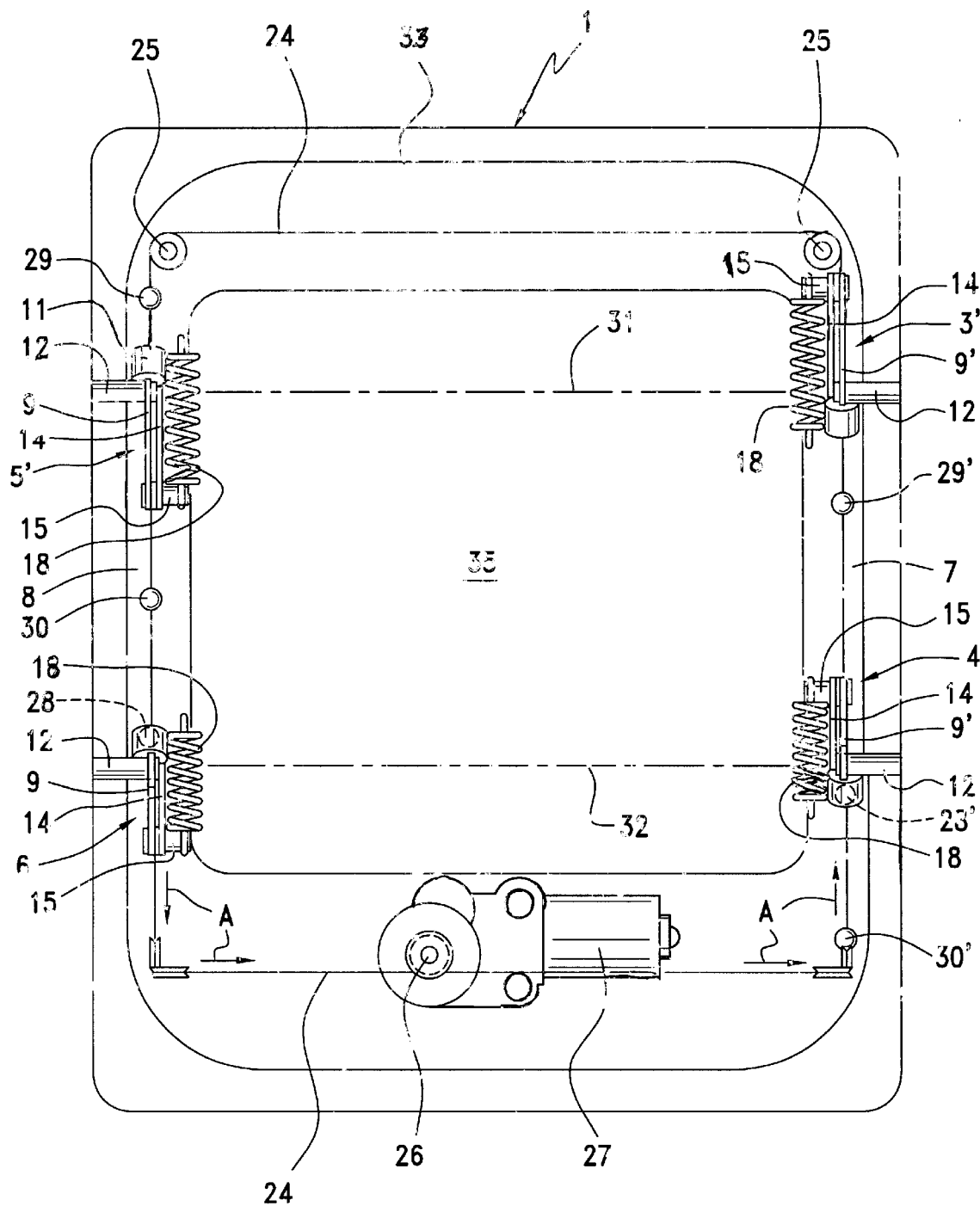
FIG. 4 is a plan view corresponding to that of FIG. 1, but showing a modified toggle joint arrangement.

Further lengthwise motion of the cable 24 in the same direction guides the attachment elements 30 and 30' on the cylinder section 22 of the engagement end 11 of the toggle lever 9 of the toggle joint 6 and 4; that is, the lever which has been pivoted upward (see FIG. 3). The attachment element 30 then slides down on the oblique cylinder outside with a cable 24 and around the lower edge 34, whereupon it is pressed by the tensioned cable 24 up into the recess. Here, the cable 24 runs through two lengthwise slots (not shown) in the cylinder section 22 on the engagement end 11 so that the attachment element 30 is reliably guided centrally into the recess 23. By means of the subsequent opposite lengthwise motion of the cable 24, the toggle lever 9 is pivoted back into the closed position so that the rear edge of the cover 2 is lowered again, while the front edge remains raised. Further lengthwise motion of the cable 24 in the same direction causes the actuating elements 29 and 29' to re-engage the two toggle joints 3 and 5 and also lowers the cover 2 by pivoting of the two toggle levers 9 so that then the hatch has again assumed its closed position.

Thus, the cover 2 can be raised by a drive means 27 in the described manner first on the rear edge and then on the front edge, and when the cable motion is reversed, can be lowered again and can therefore open and close the roof opening 35 which is surrounded by the frame 1. In a correspondingly altered arrangement of the attachment elements, first the front edge and then the rear edge of the cover 2 can also be raised. Finally, the toggle joints and the actuating elements can also be arranged and actuated such that they can raise and lower the edges of the cover which are right and left with respect to the lengthwise direction of the motor vehicle independently of one another.

If the actuating elements 30 and 30' are omitted, the roof position or cover position which is enabled according to the aforementioned description in the sequence "entirely closed"→"rear up"→"front up"→"rear closed"→"entirely closed" can be changed to the sequence "entirely closed"→"rear up"→"front up"→"entirely closed" or to the sequence "entirely closed"→"front up"→ and "rear up"→"entirely closed."

For emergency unlocking, the hinge pins 17 can be moved axially until the additional levers 14 of the toggle joints 3 to 6 are released from the holding devices 16 of the cover 2, and thus, the cover 2 can be removed from the frame 1. When the hinge pins 17 of the additional lever 14 are released, only on one of the two raising axes 31 or 32, and the cover 2 is thus not completely released, no additional safety measures (capture means) against the cover's 2 falling away during emergency opening are necessary.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Hatch in a fixed roof surface of a motor vehicle comprising:
   a frame which is located in a roof cut out opening in the fixed roof surface;
   a cover which can be opened and closed relative to the frame;
   a raising mechanism for raising and lowering said cover; and
   an actuating mechanism for actuating the raising mechanism;
   wherein the raising mechanism has a first pair of toggle joints which are supported on the frame and are connected to a first edge area of the cover and a second pair toggle joints which are supported on the frame and are connected to a second edge of the cover which is at an opposite side of the cover from said first edge area; wherein the actuating mechanism has a transmission which is movable along the frame in a guided manner and to which actuating elements are attached at a series of positions, the actuating elements at each position of the series simultaneously actuating the toggle joints of a respective one of said first and second pairs of toggle joints in a respective one of raising and lowering motions, one of the actuating elements engaging one of said first and second toggle joints for producing a tilting up of the cover at one edge into an open position in a first direction of movement of the transmission, another of said actuating elements engaging the other of said first and second toggle joints in a manner causing an opposite edge of the cover to be swung up into an open position in said first direction of movement of the transmission and produce a lowering motion of the respective edge in an opposite direction of movement of the transmission.

2. Hatch as claimed in claim 1, wherein the transmission is guided continuously around the roof opening.

3. Hatch as claimed in claim 1, wherein a drive is provided for producing a translational movement of the transmission in forward and backward motions.

4. Hatch as claimed of claim 1, wherein the transmission comprises a cable.

5. Hatch as claimed in claim 1, wherein the transmission mechanism is one of a chain, belt, wire spiral spindle and a rod.

6. Hatch as claimed in claim 1, wherein the actuating elements are attached to the transmission by one of a form-fit and a force-fit connection.

7. Hatch as claimed in claim 1, wherein each toggle joint comprises a pivotable toggle lever having an engagement section for the actuating elements.

8. Hatch in a fixed roof surface of a motor vehicle comprising:
   a frame which is located in a roof cutout opening in the fixed roof surface;
   a cover which can be opened and closed relative to the frame;
   a raising mechanism for raising and lowering said cover; and
   an actuating mechanism for actuating the raising mechanism;
   wherein the raising mechanism has a first pair of toggle joints which are supported on the frame and are connected to a first edge area of the cover and a second pair toggle joints which are supported on the frame and are connected to a second edge of the cover which is at an opposite side of the cover from said first edge area; wherein the actuating mechanism has a transmission which is movable along the frame in a guided manner to which actuating elements are attached at positions which simultaneously actuate the toggle joints of a respective one of said first and second pairs of toggle joints; wherein each toggle joint comprises a pivotable toggle lever having an engagement section for the actuating elements; and wherein the actuating elements are in the form of one of balls, ellipsoids and cylinders which are pressed securely onto the transmission; and wherein the toggle lever has a recess for receiving one of the actuating elements under action of the transmission.

9. Hatch as claimed in claim 8, wherein the transmission comprises a cable.

10. Hatch as claimed in claim 7, wherein each toggle lever is pivotally connected to the cover via an additional lever by a connection which is detachable for emergency opening of the cover.

11. Hatch as claimed in claim 10, wherein each additional lever is pivotally connected to the cover via a releasable hinge pin; and wherein, when the hinge pins are released on one of two raising axes, the other of the raising axes forms a pivot axis for the cover during emergency opening thereof.

12. Hatch as claimed in claim 1, wherein the transmission is driven by one of a manually actuated drive unit and a drive motor.

13. Hatch as claimed claim 1, wherein one first and second pairs of toggle joints is actuated by the actuating means before the other of the first and second pairs of toggle joints for raising one edge of the cover before the other.

14. Hatch in a fixed roof surface of a motor vehicle comprising:
   a frame which is located in a roof cutout opening in the fixed roof surface;
   a cover which can be opened and closed relative to the frame;
   a raising mechanism for raising and lowering said cover; and
   an actuating mechanism for actuating the raising mechanism;
   wherein the raising mechanism has a first pair of toggle joints which are supported on the frame and are connected to a first edge area of the cover and a second pair toggle joints which are supported on the frame and are connected to a second edge of the cover which is at an opposite side of the cover from said first edge area; wherein the actuating mechanism has a transmission which is movable along the frame in a guided manner to which actuating elements are attached at positions which simultaneously actuate the toggle joints of a respective one of said first and second pairs of toggle joints; and wherein a second actuating element is provided for each toggle joint, said second actuating element engaging a raised toggle joint in backward motion of the transmission.

15. Hatch as claimed in claim 1, wherein the transmission is pre-tensioned by a spring.

16. Hatch as claimed in claim 10, wherein one of the toggle lever and additional lever of one of said first and second toggle joints has a length that is different from the length of said one of the toggle lever and additional lever of the other of said first and second toggle joints for placing said cover in a completely opened position which is not parallel to the frame.

17. Hatch as claimed in claim 1, wherein said actuating mechanism are engageable with and disengageable from said toggle joints by movement of said transmission mechanism.

* * * * *